United States Patent
Jiang et al.

(10) Patent No.: US 6,879,124 B1
(45) Date of Patent: Apr. 12, 2005

(54) METHOD TO DETECT THE TRUE ZERO-CROSSING POINTS OF THE PHASE BACK EMF FOR SENSORLESS CONTROL OF BRUSHLESS DC MOTORS

(76) Inventors: Quan Jiang, T52, West Coast Crescent #04-02, Singapore 128036 (SG); Chao Bi, Blk 124, #24-17 Jurong East Street 13, Singapore 600124 (SG)

(*) Notice: Subject to any disclaimer, the term of this patent is extended or adjusted under 35 U.S.C. 154(b) by 0 days.

(21) Appl. No.: 10/752,013

(22) Filed: Jan. 7, 2004

(51) Int. Cl.[7] .............................................. H02K 13/00
(52) U.S. Cl. ...................... 318/439; 318/138; 318/245; 318/254; 318/560; 318/561; 360/73.03
(58) Field of Search ................................ 318/138, 245, 318/254, 439, 560, 561, 800–812; 360/73.03, 75

(56) References Cited

U.S. PATENT DOCUMENTS

| | | | | |
|---|---|---|---|---|
| 4,743,815 A | * | 5/1988 | Gee et al. ................... | 318/254 |
| 4,912,378 A | * | 3/1990 | Vukosavic .................. | 318/254 |
| 5,481,167 A | * | 1/1996 | Rohrbaugh et al. ......... | 318/254 |
| 5,866,998 A | * | 2/1999 | Menegoli .................... | 318/254 |
| 5,990,656 A | * | 11/1999 | Kardash ..................... | 318/807 |

* cited by examiner

Primary Examiner—Paul Ip (57) ABSTRACT

In the present system and method, ZCP level signals of each phase voltage are first obtained. Among the detected ZCP level signals, some ZCPs are generated by phase back EMF, which are true ZCPs and other ZCPs by commutations, which are false ZCPs. The duration of the false ZCP level outputs varies with the excited phase current, inductance and back EMF of motors, the present invention utilizes fixed-width narrow pulse signals corresponding to the rising and falling edges of the ZCP level outputs in order to eliminate influences of the earlier disclosed motor parameters. These fixed width pulse signals make up the ZCP pulse signal. Because the first edge of the plurality of false ZCP level signal substantially corresponds to the switching-off signal of the commutated-off excited phase, a first false ZCP masking signal having pulses wider than the ZCP pulse signal are applied to mask the first plurality of false ZCP signals. Comparing the logic values of the ZCP level signals, the pulses of the ZCP pulse signals are identified as true ZCPs when the logic values of the current pulse are different from the logic value of a preceding pulse. Correspondingly, if the logic value of the current pulse is the same as the logic value of the preceding pulse, the current pulse is a false ZCP. In these way, the phase-delay free and true zero-crossing points of all the phase back EMFs can be obtained with the simple circuit and logic processing.

11 Claims, 8 Drawing Sheets

METHOD TO DETECT THE TRUE ZERO-CROSSING POINTS OF THE PHASE BACK EMF FOR SENSORLESS CONTROL OF BRUSHLESS DC MOTORS

FIELD OF THE INVENTION

The present invention generally relates to detection of rotor position of sensorless brushless DC (BLDC) motors. In particular, the invention relates to a system and method for phase-delay free detecting of zero crossing points of phase back EMF in sensorless BLDC motors.

BACKGROUND OF THE INVENTION

Detecting of phase back EMF zero crossing points (ZCPs) of sensorless BLDC motors has been used for determining rotor positions in controlling of phase commutation in BLDC motors. Traditionally, the determining of rotor positions has been performed using position sensors. However present day methods have gravitated towards sensorless detection and control of BLDC motors.

Several methods for sensorless detection of rotor positions have been developed. Some of the existing methods are: a) detecting rotor positions of unexcited phase voltages using low pass filters; b) comparing integration of unexcited phase voltages with a preset threshold voltage; c) indirect position sensing from integration of third harmonic stator voltages; d) conducting signals of freewheeling diodes; e) extended Kalman filter position estimation with current sensors and voltage sensors; and f) measuring inductance variations with respect to rotor positions.

The above methods have their own inherent advantages and disadvantages. When using back EMF ZCP detection, the concern is with the accurate detection of the true ZCPs of phase back EMF through motor terminal voltages. During commutation of each phase of a BLDC motor, a well-known problem of voltage spikes occurring on the silent phase voltage when one excited phase is switched off.

Usually, these voltage spikes are large enough in amplitude to cause a voltage change on the silent phase voltage from positive to negative or vice versa. Each of these commutations produces two ZCPs on the silent phase voltage, which are not true ZCPs but noise or false ZCPs of the phase back EMF. These "fake" ZCPs produced by the switching-off during commutation of the excited phase becomes a real concern when the commutation control of the sensorless BLDC motor are dependent on the detection of these ZCPs.

Existing methods have attempted to filter away these "fake" ZCPs, but have disadvantageously resulted in distortion of the ZCP timings, i.e., phase-delay and therefore, the limitation on the speed range.

It can thus be seen that there exists a need for a phase-delay free and wide speed range applicable way for detecting zero crossing points of phase back EMF in BLDC motors that can overcome the disadvantages of the existing art, particularly in high-speed BLDC motors.

SUMMARY OF THE INVENTION

The present invention seeks to provide a phase-delay free, simple and robust method for detecting zero-crossing points of phase back EMF in sensorless BLDC motors, which is independent of motor speed and parameters.

Accordingly, the present invention provides a simple and phase-delay free ZCP detecting circuit and a corresponding logic processing method to identify the true ZCPs belonged to the silent phase back EMFs. The detecting circuit and the processing method can be applied to all the sensorless BLDC motors and unlimited speed ranges. Therefore, the universal sensorless control of BLDC motor can be implemented easily with this invention.

Accordingly, in a first aspect, the invention provides a system for detecting Zero Crossing Points (ZCPs) of phase back EMF in a brushless DC motor having a plurality of switching signals for commutating each of a plurality of phases of the brushless DC motor, the system comprising: a ZCP level detection circuit for receiving terminal voltages of each of a plurality of phases of the brushless DC motor and a neutral voltage and for generating a ZCP level output for each of a plurality of phases of the brushless DC motor, the ZCP level output comprising a plurality of rising and falling edges corresponding to each Zero Crossing Point of a phase voltage for each of a plurality of phases of the brushless DC motor; a pulse generator for receiving the plurality of ZCP level outputs and for generating a ZCP pulse signal, the ZCP pulse signal comprising a plurality of pulses corresponding to each of the plurality of falling and rising edge of the plurality of ZCP level outputs; a first false ZCP masking signal for masking a first plurality of false ZCPs from the ZCP pulse signal and for generating a first masked ZCP signal, the first false ZCP masking signal comprises a plurality of pulses corresponding to the first plurality of false ZCPs; and a state comparator for comparing logic values of the ZCP level outputs corresponding to a plurality of pulses of the first masked ZCP signal, and for masking a second plurality of false ZCPs to generate a true ZCP signal; wherein the plurality of pulses of the ZCP pulse signal is of a first predetermined width.

Accordingly, in another aspect, the present invention provides a method for detecting Zero Crossing Points (ZCPs) of phase back EMF in a brushless DC motor having a plurality of switching signals for commutating each of a plurality of phases of the brushless DC motor, the method comprises the steps: receiving a plurality of terminal voltages corresponding to a plurality of phase voltages of the brushless DC motor; generating a plurality of ZCP level outputs from the plurality of phase voltages; generating a ZCP pulse signal from the plurality of ZCP level outputs using a pulse generator; performing a first masking by masking the ZCP pulse signal using a first false ZCP masking signal thereby removing a first plurality of false ZCPs and generating a first masked ZCP signal; performing a state comparison of logic values of the plurality of ZCP level outputs corresponding to a plurality of pulses of the first masked ZCP signal to mask away a second plurality of false ZCPs and to generate a true ZCP signal of the phase back EMF; wherein the plurality of pulses of the ZCP pulse signal is of a first predetermined width.

BRIEF DESCRIPTION OF THE DRAWINGS

A preferred embodiment of the present invention will now be more fully described, with reference to the drawings of which.

DETAILED DESCRIPTION OF THE DRAWINGS

A method and system for detecting the zero crossing points of phase back EMF in BLDC motors with a preferred embodiment are described. In the following description, details are provided to describe the preferred embodiment. It shall be apparent to one skilled in the art, however that the invention may be practiced without such details. Some of the details may not be described at length so as not to obscure the invention.

According to the operating characteristics of BLDC motor, a simple, low-cost and phase-delay free system and method for detecting ZCPs with either an actual neutral voltage or a virtual neutral voltage are disclosed. Through the system and method, ZCP level signals of each phase voltage are first obtained. Among the detected ZCP level signals, some ZCPs are generated by phase back EMF, which are true ZCPs and other ZCPs are caused by commutations, which are considered false ZCPs. Since the durations of the false zero-crossing point level signals varies with the excited phase current, inductance and back EMF of motors, the present invention utilizes fixed-width narrow pulses corresponding to the rising and falling edges of the ZCP level signals in order to eliminate influences of the earlier disclosed motor parameters and the motor operating status.

These fixed width pulses make up the ZCP pulse signal. As the first edge of the false ZCP level signals substantially corresponds to the switching-off signal of the commutated-off excited phase, a first false ZCP masking signal having pulses wider than the ZCP pulse signal is applied to mask the first plurality of false ZCP signals. Comparing the logic values of the ZCP level signals, the pulses of the ZCP pulse signals are identified as true ZCPs when the logic values of the current pulse are different from the logic value of a preceding pulse. Correspondingly, if the logic value of the current pulse is the same as the logic value of the preceding pulse, the current pulse is a false ZCP. In this way, the phase-delay free and true zero-crossing points of all the phase back EMFs can be obtained with the simple circuit and logic processing.

Figure 1:
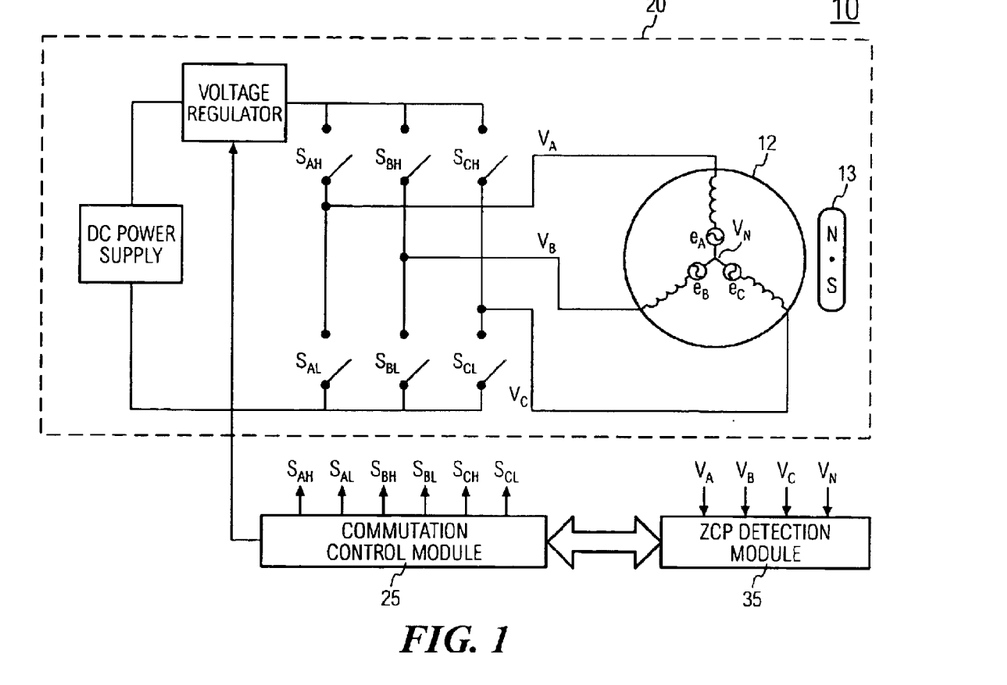
FIG. 1 illustrates a typical sensorless BLDC motor in accordance with the present invention.

Referring to FIG. 1, the system 10 in accordance with the present invention comprises a BLDC motor 20, a commutation control module 25, and a Zero Crossing Point (ZCP) detection module 35.

The BLDC motor 20 typically comprises a stator 12 having three phases, a rotor 13, and a plurality of switches controlled by a plurality of switching signals ($S_{AH}$, $S_{BH}$, $S_{CH}$, $S_{AL}$, $S_{BL}$, $S_{CL}$). The switches being coupled to each phase of the stator 12 phases for commutating the phases of the stator.

Figure 3:
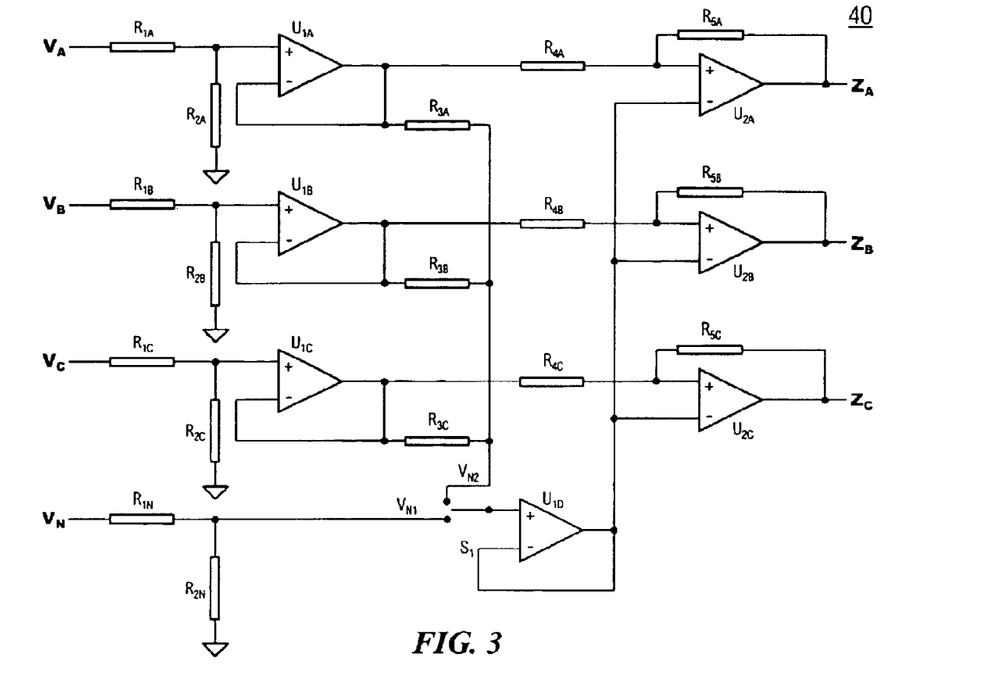
FIG. 3 illustrates a ZCP level detection circuit of FIG. 2.
Figure 4A:
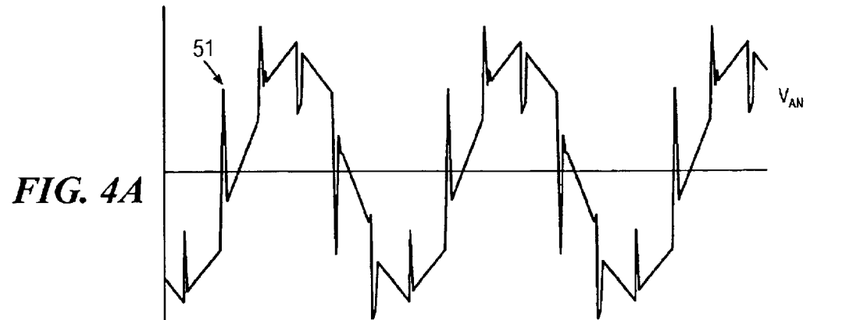
FIG. 4A illustrates a phase voltage of phase A, FIG. 4B a switching signal $S_{AH}$, FIG. 4C a switching signal $S_{AL}$, and FIG. 4D a ZCP level output of phase A of FIG. 1.

The ZCP detection module 35 receives inputs of terminal voltages from each phase of the stator 12 in the BLDC motor 20 and also a neutral voltage $V_N$ from the center of a star connection of the stator windings or a virtual neutral voltage from the equivalent circuit in FIG. 3. The ZCP detection module 35 compares the terminal voltages with the neutral voltage $V_N$ to obtain individual phase voltages ($V_{AN}$ or $V_A$-$V_N$, $V_{BN}$ or $V_B$-$V_N$, $V_{CN}$ or $V_C$-$V_N$) of each phase and use them to determine the ZCPs. An example of phase voltage of phase A, $V_{AN}$ is shown in FIG. 4A.

The ZCP detection module 35 is also coupled to the commutation control module 25. The commutation control module 25 receives data on the ZCPs from the ZCP detection module 35. The commutation control module 25 utilizes the data to generate the switching signals ($S_{AH}$, $S_{BH}$, $S_{CH}$, $S_{AL}$, $S_{BL}$, $S_{CL}$) to control the plurality of switches for the commutation control of the BLDC motor 20. The commutation control of BLDC motors 20 is well known in the art, details of which will not be further discussed unless it pertains directly to the present invention.

Figure 2:
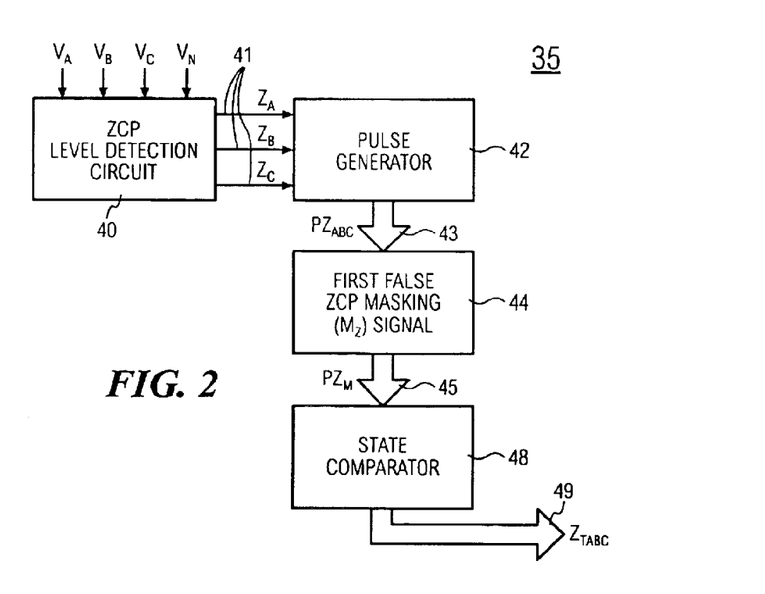
FIG. 2 illustrates a ZCP detection module of FIG. 1.

Referring to FIG. 2, the ZCP detection module 35 comprises a ZCP level detection circuit 40 which receives input from the terminal voltages and the neutral voltage to generate a plurality of ZCP level outputs 41 ($Z_A$, $Z_B$, $Z_C$) corresponding to each of the phase voltages of the BLDC motor 20. The ZCP level outputs 41 comprises of rising and falling edges indicating a change of state when the phase voltages rise and fall through a zero values indicating a ZCP.

The ZCP level outputs 41 are received by a pulse generator 42 which detects and consolidates the falling and rising edges of all the ZCP outputs 41 of the different phases and generates a ZCP pulse signal ($PZ_{ABC}$) 43 comprising a pulse at each falling or rising edge of all the ZCP level outputs 41.

Figure 5A:
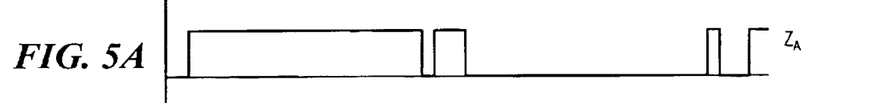
FIG. 5A illustrates the ZCP level output of phase A of FIG. 4D with a high sampling rate, FIG. 5B a ZCP level output of phase B, and FIG. 5C a ZCP level output of phase C, and FIG. 5D a ZCP pulse signal ($PZ_{ABC}$)
Figure 5B:
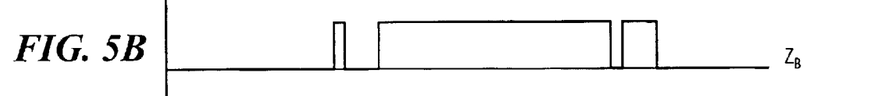
Figure 5C:
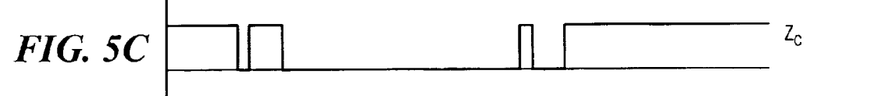
Figure 5D:
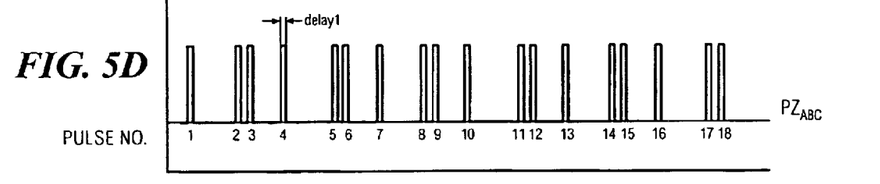
Figure 6A:
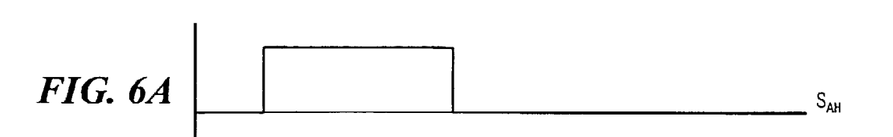
FIG. 6A illustrates the switching signal $S_{AH}$, FIG. 6B the switching signal $S_{AL}$, FIG. 6C a switching signal $S_{BH}$, FIG. 6D a switching signal $S_{BL}$, FIG. 6E a switching signal $S_{CH}$, FIG. 6F a switching signal $S_{CL}$, and FIG. 6G a First false ZCP masking ($M_Z$) signal.
Figure 6B:
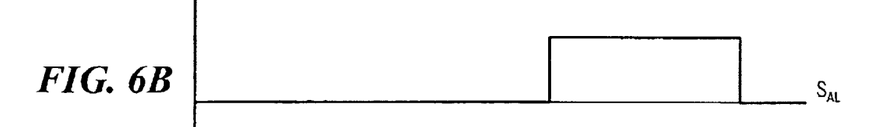
Figure 6C:
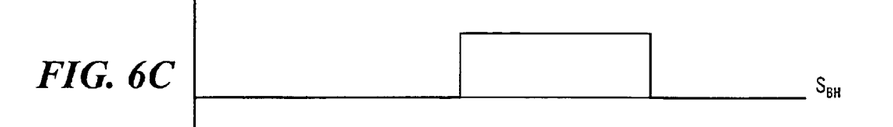
Figure 6D:
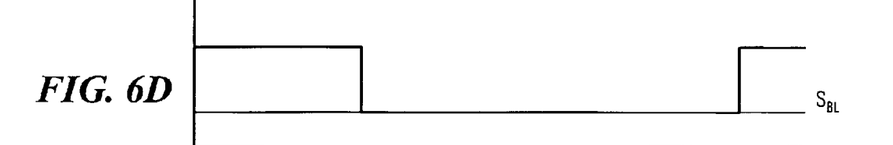
Figure 6E:
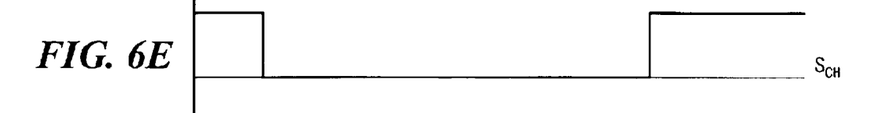
Figure 6F:
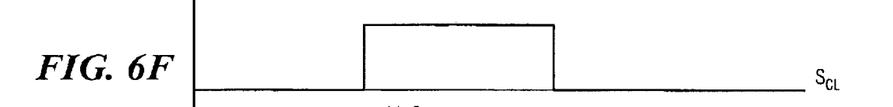
Figure 6G:
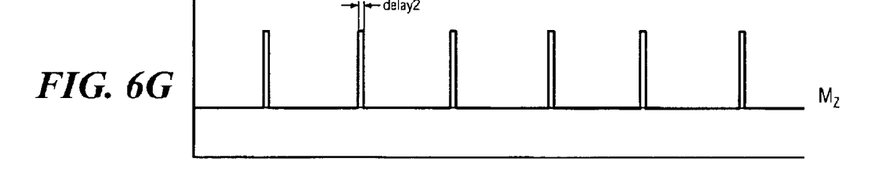

Referring to FIGS. 5A, B and C, the respective ZCP level outputs 41 ($Z_A$, $Z_B$, $Z_C$) of each of the three phases (A, B, C) of the BLDC motor 20 are shown. The generated ZCP pulse signals ($PZ_{ABC}$) 43 are shown in FIG. 5D, where each of the pulses represents an occurrence of a ZCP. The pulses are numbered 1 to 18. It should be noted that the sum of pulses during one electrical cycle may be from 6 ZCP pulses without false ZCP pulses to 18 ZCP pulses with 12 ZCP pulses, which will depend on the motor parameters and its operation status.

Referring to FIG. 3, the ZCP level detection circuit 40 is shown where every a plurality of comparators are utilized to latch onto the phase voltage signals to produce the ZCP level outputs 41. The ZCP level detection circuit 40 comprises of tapped resistors for high terminal voltages, input buffer amplifiers, a virtual neutral voltage generator, a selecting switch for the actual neutral voltage or the virtual neutral voltage. The comparators are for generating zero-crossing point level signals from the three phase voltages. The operation of such latching circuits are well known to one skilled in the art and the present ZCP level detection circuit 40 is a non-limiting example.

Figure 4B:
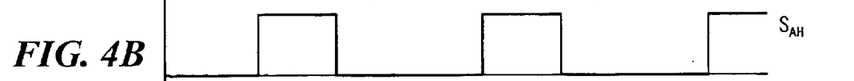
Figure 4C:
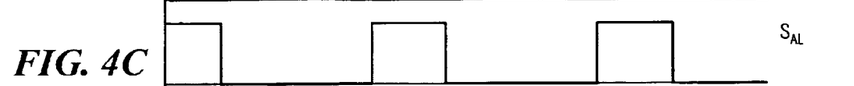
Figure 4D:
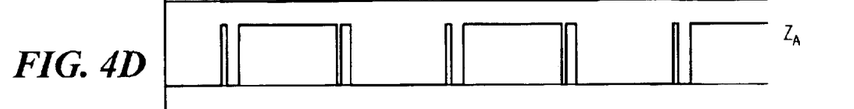

Referring to FIG. 4A, the phase voltage of phase A, $V_{AN}$, is shown with the corresponding activations of the switch $S_{AH}$ in FIG. 4B, and the ZCP level output 41 of phase A, $Z_A$ in FIG. 4C. The switching OFF of the switches for the phase commutation results in voltage spikes 51 in phase A as seen in FIG. 4A. These voltage spikes 51 may cause ZCPs when their amplitudes are big enough. But because they are not caused by the phase back EMF generated by the movement of the rotor with reference to the stator, it is not considered a true ZCP. As such these voltage spikes 51 generated by the switching-off of the switches for the phase commutations are referred to as false ZCPs. The ZCP level outputs 41 from the ZCP level detection circuit 40 for phase A, $Z_A$ is shown in FIG. 4C. The other two phases have similar voltage signatures as shown in FIGS. 4A, B and C albeit different timings.

Referring again to FIG. 2, the ZCP pulse signal ($PZ_{ABC}$) 43 from the pulse generator 42 then undergoes a first masking utilizing a First false ZCP masking ($M_Z$) signal 44. The First false ZCP masking ($M_Z$) signal is generated from the switching-off signals ($S_{AH}$, $S_{AL}$, $S_{BH}$, $S_{BL}$, $S_{CH}$, $S_{CL}$) for masking away a first set of false ZCPs. The First false ZCP masking ($M_Z$) signal 44 comprises a plurality of pulses having a narrow and fixed width which are slightly wider than the pulses in the ZCP pulse signal ($PZ_{ABC}$) 43. The plurality of pulses are independent of the speed and the parameters of the BLCD motor 20. The resulting First masked ZCP signal ($PZ_M$) 45 comprises a set of true ZCPs and a second set of false ZCPs; the first set of false ZCPs having been removed by the First false ZCP masking ($M_Z$) signal 44.

Figure 7A:
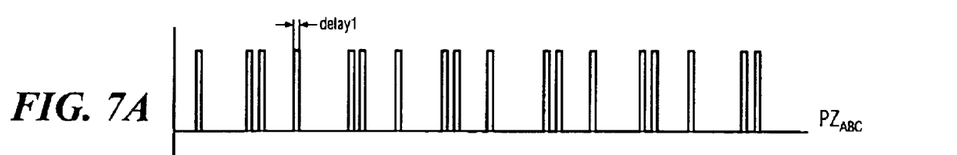
FIG. 7A illustrates the ZCP pulse signals ($PZ_{ABC}$), FIG. 7B the First false ZCP masking ($M_Z$) signal, FIG. 7C a First masked ZCP signal ($PZ_M$), and FIG. 7D a True ZCP signal ($Z_{TABC}$)
Figure 7B:
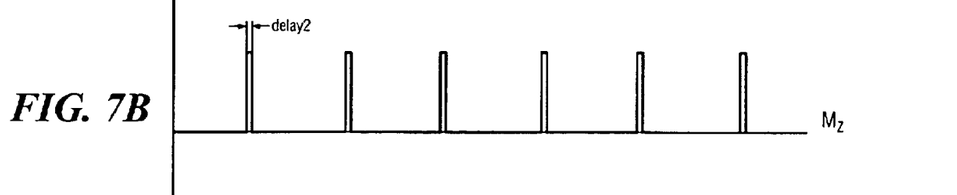
Figure 7C:
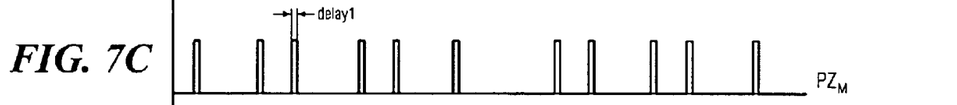

Referring to FIG. 7B, the First false ZCP masking ($M_Z$) signal 44 is shown with the ZCP pulse signal ($PZ_{ABC}$) 43 shown in FIG. 7A. The resulting first masked ZCP signal ($PZ_M$) 45 is shown in FIG. 7C with a first set of false ZCPs masked away.

Figure 7D:
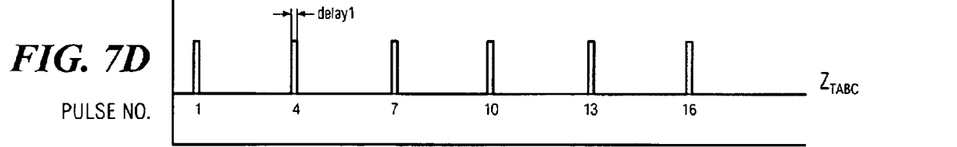

The first masked ZCP signals ($PZ_M$) 45 then undergoes a state comparison using a state comparator 48 of ZCP level logic values where the remaining second set of false ZCPs will also be removed. The eventual signal output from the ZCP Detection Module 35 is a set of pulses making up the True ZCP signal ($Z_{TABC}$) 49 as shown in FIG. 7D.

ZCP Pulse Signal ($PZ_{ABC}$)

Figure 8:
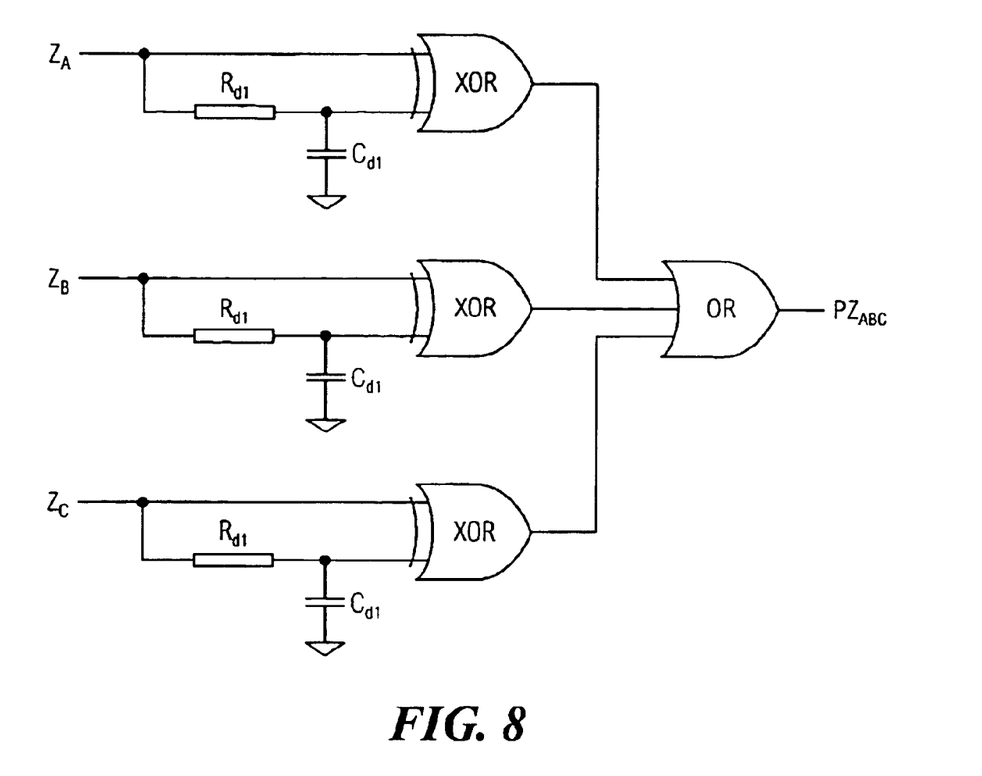
FIG. 8 illustrates a logical circuit for generating the ZCP pulse signal ($PZ_{ABC}$)

The pulse generator 42 which detects the falling and rising edges of all the ZCP outputs 41 generates a ZCP pulse signal ($PZ_{ABC}$) 43 comprising a pulse at each falling of rising edge of the ZCP level outputs 41. The pulses that make up the ZCP pulse signal ($PZ_{ABC}$) 43 may be represented by the following logical equation:

$$PZ_{ABC} = (Z_A \text{ XOR } Z_{A\_delay1})$$

$$OR (Z_B \text{ XOR } Z_{B\_delay1})$$

$$OR (Z_C \text{ XOR } Z_{C\_delay1}) \quad (1)$$

Where $Z_A$, $Z_B$, and $Z_C$ are the ZCP level outputs 41 from the ZCP level detection circuit 40 and "delay1" is a first predetermined width or duration of the pules of the ZCP pulse signal ($PZ_{ABC}$) 43. Referring to FIG. 8 a logical circuit for generating the ZCP pulse signal ($PZ_{ABC}$) 43 as shown in equation (1) is shown, where "delay1" could be set by the product of $R_{d1}$ and $C_{d1}$.

Using binary states to represent the ZCP outputs 41 of all three phases, i.e. $Z_A$, $Z_B$, and $Z_C$ and also that of the ZCP pulse signals ($PZ_{ABC}$) 43, we are able to in TABLE.1.

TABLE 1

| Pulse No. | Status | $Z_A$ | $Z_B$ | $Z_C$ | ($Z_A$, $Z_B$, $Z_C$) | Back EMF ZCP? |
|---|---|---|---|---|---|---|
| 1 | State 1 | 1 | 0 | 1 | 5 | True |
| 2 | State 2' | 1 | 0 | 0 | 4 | False |
| 3 | State 1' | 1 | 0 | 1 | 5 | False |
| 4 | State 2 | 1 | 0 | 0 | 4 | True |
| 5 | State 3' | 1 | 1 | 0 | 6 | False |
| 6 | State 2' | 1 | 0 | 0 | 4 | False |
| 7 | State 3 | 1 | 1 | 0 | 8 | True |
| 8 | State 4' | 0 | 1 | 0 | 2 | False |
| 9 | State 3' | 1 | 1 | 0 | 6 | False |
| 10 | State 4 | 0 | 1 | 0 | 2 | True |
| 11 | State 5' | 0 | 1 | 1 | 3 | False |
| 12 | State 4' | 0 | 1 | 0 | 2 | False |
| 13 | State 5 | 0 | 1 | 1 | 3 | True |
| 14 | State 6' | 0 | 0 | 1 | 1 | False |
| 15 | State 5' | 0 | 1 | 1 | 3 | False |
| 16 | State 6 | 0 | 0 | 1 | 1 | True |
| 17 | State 1' | 1 | 0 | 1 | 5 | False |
| 18 | State 6' | 0 | 0 | 1 | 1 | False |

Where the Pulse Nos. correspond to the Pulse Nos. in FIG. 5D. The True ZCPs can be seen to occur at Pulse no. 1, 4, 7, 10, 13, and 16.

First False ZCP Masking ($M_Z$) Signal

Referring to FIG. 5 and FIG. 6 and Table 1, it is observed that the pulse Nos. 2, 5, 8, 11, 14 and 17 which are also referred to presently as the first set of false ZCPs, occur during the beginning of commutation of one of the three phases of the stator. Referring to FIGS. 6A, B, C and D, these first set of false ZCPs occur, when any one of the excited phases is switched OFF. As such, the switching signals ($S_{AH}$, $S_{AL}$, $S_{BH}$, $S_{BL}$, $S_{CH}$, $S_{CL}$) used for switching the plurality of switches for commutating the stator phase can be used for generating mask signals for these first set of false ZCPs. Modifying Table 1 by removing the first set of false ZCPs, the following TABLE.2 is obtained.

TABLE 2

| Pulse No. | Status | $Z_A$ | $Z_B$ | $Z_C$ | ($Z_A$, $Z_B$, $Z_C$) | Back EMF ZCP? |
|---|---|---|---|---|---|---|
| 1 | State 1 | 1 | 0 | 1 | 5 | True |
| 3 | State 1' | 1 | 0 | 1 | 5 | False |
| 4 | State 2 | 1 | 0 | 0 | 4 | True |
| 6 | State 2' | 1 | 0 | 0 | 4 | False |
| 7 | State 3 | 1 | 1 | 0 | 6 | True |
| 9 | State 3' | 1 | 1 | 0 | 6 | False |
| 10 | State 4 | 0 | 1 | 0 | 2 | True |
| 12 | State 4' | 0 | 1 | 0 | 2 | False |
| 13 | State 5 | 0 | 1 | 1 | 3 | True |
| 15 | State 5' | 0 | 1 | 1 | 3 | False |
| 16 | State 6 | 0 | 0 | 1 | 1 | True |
| 18 | State 6' | 0 | 0 | 1 | 1 | False |

Figure 9:
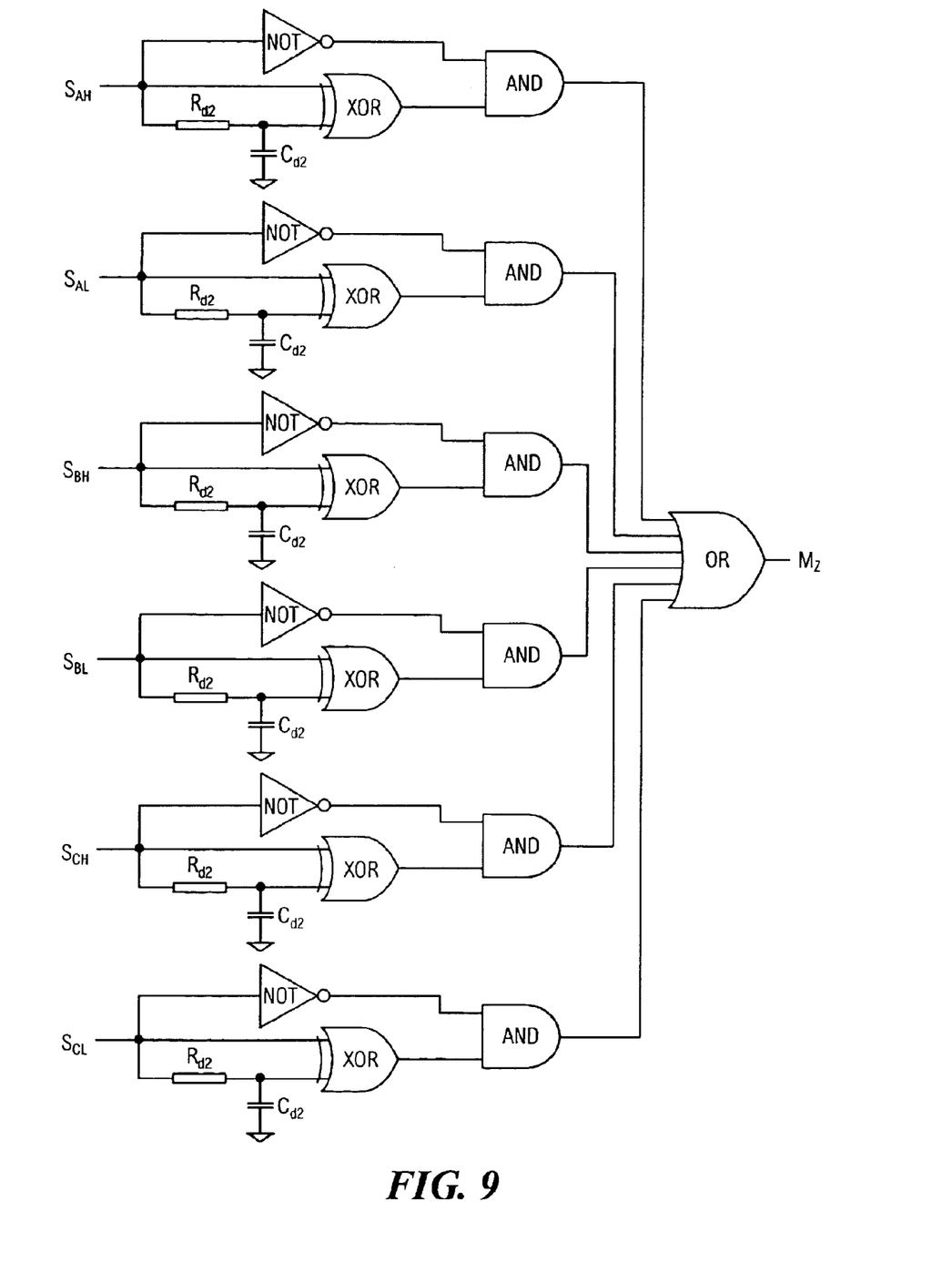
FIG. 9 illustrates a logical circuit for generating the First false ZCP masking ($M_Z$) signal.

The First False ZCP Masking ($M_Z$) 44 signal, can be derived from the switching signals, TABLE.1 and TABLE.2 and may be represented by the following logical equation:

$$M_Z = \{(S_{AH} \text{ XOR } S_{AH\_delay2}) \text{ AND NOT } S_{AH}\}$$

$$OR\{(S_{AL} \text{ XOR } S_{AL\_delay2}) \text{ AND NOT } S_{AL}\}$$

$$OR\{(S_{BH} \text{ XOR } S_{BH\_delay2}) \text{ AND NOT } S_{BH}\}$$

$$OR\{(S_{BL} \text{ XOR } S_{BL\_delay2}) \text{ AND NOT } S_{BL}\}$$

$$OR\{(S_{CH} \text{ XOR } S_{CH\_delay2}) \text{ AND NOT } S_{CH}\}$$

$$OR\{(S_{CL} \text{ XOR } S_{CL\_delay2}) \text{ AND NOT } S_{CL}\} \quad (2)$$

Where $S_{AH}$, $S_{BH}$, $S_{CH}$, $S_{AL}$, $S_{BL}$, $S_{CL}$ are the switching signals of the plurality of switches for commutating the BLDC motor 20. "delay2" is a second predetermined width or duration where delay2 is greater than delay1. Referring to FIG. 9, a logical circuit for generating the First false ZCP Masking ($M_Z$) 44 signal as shown in equation (2) is shown, where "delay2" could be set by the product of $R_{d2}$ and $C_{d2}$.

The First False ZCP Mask ($M_Z$) 44 serves to identify the first voltage spike in each phase caused by the switching OFF of an excited phase during commutation, treating them as false ZCPs and removing them from consideration.

First Masked ZCP Signal ($PZ_M$)

Referring to FIG. 7C, the first masked ZCP signal ($PZ_M$) 45 without the first set of false ZCPs is shown. The logical equation of the masking operation may be represented as:

$$PZ_M = PZ_{ABC} \text{ AND NOT } M_Z \quad (3)$$

Figure 10:
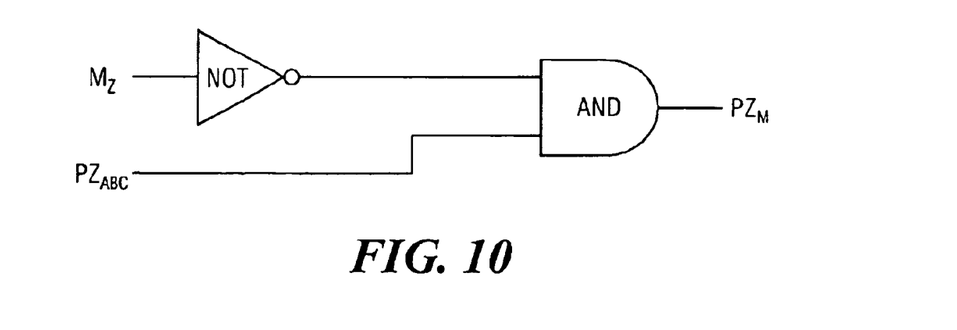
FIG. 10 illustrates a logical circuit for generating the First masked ZCP signal ($PZ_M$)

Referring to FIG. 10, a logical circuit for generating the first masked ZCP signal ($PZ_M$) 45 as shown in equation (3) is shown.

True ZCP Signal ($Z_{TABC}$)

The first set of false ZCPs have been removed to obtain the first masked ZCP signal ($PZ_M$) 45. Following that, a state comparison using a state comparator 48 is performed to identify the true ZCPs from the remaining second set of false ZCPs thus obtaining the True ZCP signal ($Z_{TABC}$) 49. The True ZCP signal ($Z_{TABC}$) 49 comprises only of pulses representing the True ZCPs caused by phase back EMF generated by the movement of the rotor 13 with reference to the stator 12.

The states comparison may be derived from TABLE 1 and TABLE 2. The final output is the True ZCP signal ($Z_{TABC}$) 49 which may be represented by the logical equation:

$$Z_{TABC} = PZ_M(k), \text{ if } [(Z_A, Z_B, Z_C) \text{ at } PZ_M(k-1)]$$

$$\text{XOR } [(Z_A, Z_B, Z_C) \text{ at } PZ_M(k)] = \text{"True"} \quad (4)$$

Where k is the pulse nos. 1, 3, 4, 6, 7, 8, 10, 12, 13, 15, 16, 18, . . .

Figure 11:
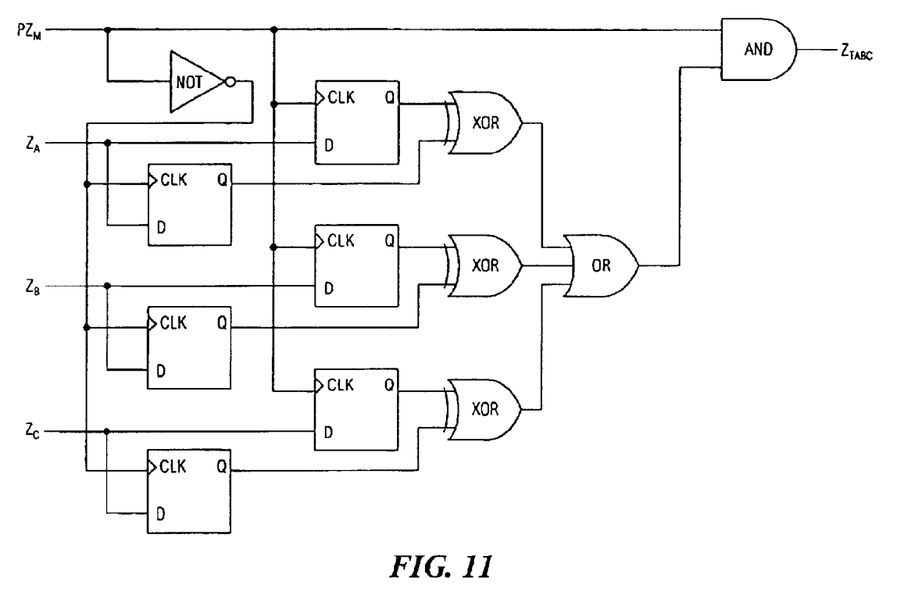
FIG. 11 illustrates a logical circuit for masking a Second set of false ZCPs and for generating the True ZCP signal ($Z_{TABC}$).

To understand the logic of the states comparison reference should be made to TABLE.2 and FIG. 7D. The True ZCP signal ($Z_{TABC}$) 49 comprises of pulse nos. 1, 4, 7, 10 13, and 16. Looking at the logic values ($Z_A$, $Z_B$, $Z_C$) of the ZCP level signals corresponding to the true ZCP pulses experience a change in the logic values corresponding to the preceding pulse. The false ZCPs are then identified to be all pulses experiencing a pulse with a logic value which remains unchanged comparing with ones of the preceding pulse. Referring to FIG. 11, a logical circuit for generating the True ZCP signal ($Z_{TABC}$) 49 signal as shown in equation (4) is shown.

The final output from the ZCP detection module 35 is thus the True ZCP signal ($Z_{TABC}$) 49, which is then fed back to the commutation control module 25 for the commutation control of the BLDC motor 20.

It will be appreciated by a person skilled in the art that the logical circuits of FIG. 3, FIG. 8 to FIG. 11 do not limit the scope of the invention. The implementation of the present invention may be performed by utilizing a variety of methods not limited to firmware of CPLD or FPGA, hardware logic using RC delay circuits, or software or firmware of micro-controllers or embedded microprocessors.

It will be appreciated that various modifications and improvements can be made by a person skilled in the art without departure from the scope of the present invention.

What is claimed is:

1. A system for detecting Zero Crossing Points (ZCPs) of phase back EMF in a brushless DC motor having a plurality of switching signals for commutating each of a plurality of phases of said brushless DC motor, said system comprising:
   a ZCP level detection circuit for receiving terminal voltages of each of a plurality of phases of said brushless DC motor and a neutral voltage and for generating a ZCP level output for each of a plurality of phases of said brushless DC motor, said ZCP level output comprising a plurality of rising and falling edges corresponding to each Zero Crossing Point of a phase voltage for each of a plurality of phases of said brushless DC motor;
   a pulse generator for receiving said plurality of ZCP level outputs and for generating a ZCP pulse signal, said ZCP pulse signal comprising a plurality of pulses corresponding to each of said plurality of falling and rising edge of said plurality of ZCP level outputs;
   a first false ZCP masking signal for masking a first plurality of false ZCPs from said ZCP pulse signal and for generating a first masked ZCP signal, said first false ZCP masking signal comprises a plurality of pulses corresponding to said first plurality of false ZCPs; and
   a state comparator for comparing logic values of said ZCP level outputs corresponding to a plurality of pulses of said first masked ZCP signal, and for masking a second plurality of false ZCPs to generate a true ZCP signal;
   wherein said plurality of pulses of said ZCP pulse signal is of a first predetermined width.

2. The system in accordance with claim 1, wherein said first ZCP masking signal comprises a plurality of pulses corresponding to a change of state from ON to OFF of any of said plurality of phases of said brushless DC motor.

3. The system in accordance with claim 1, wherein said plurality of pulses of said first false ZCP masking signal is of a second predetermined width.

4. The system in accordance with claim 2, wherein said second predetermined width being wider than said first predetermined width.

5. The system in accordance with claim 2 wherein said state comparator masks away said second plurality of false ZCPs having a plurality of pulses each having a pulse having a same logic value as the preceding pulse of each of said plurality of pulses of said second plurality of false ZCPs.

6. A method for detecting Zero Crossing Points (ZCPs) of phase back EMF in a brushless DC motor having a plurality of switching signals for commutating each of a plurality of phases of said brushless DC motor, said method comprises the steps:
   a. receiving a plurality of terminal voltages corresponding to a plurality of phase voltages of said brushless DC motor;
   b. generating a plurality of ZCP level outputs from said plurality of phase voltages;
   c. generating a ZCP pulse signal from said plurality of ZCP level outputs using a pulse generator;
   d. performing a first masking by masking said ZCP pulse signal using a first false ZCP masking signal, thereby removing a first plurality of false ZCPs and generating a first masked ZCP signal;
   e. performing a state comparison of logic values of said plurality of ZCP level outputs corresponding to a plurality of pulses of said first masked ZCP signal to mask away a second plurality of false ZCPs and to generate a true ZCP signal;

wherein said plurality of pulses of said ZCP pulse signal is of a first predetermined width.

7. The method in accordance with claim 6, wherein said step a. further comprises receiving an actual neutral voltage or a self generated virtual voltage.

8. The method in accordance with claim 6, wherein said first false ZCP masking signal comprises a plurality of pulses corresponding to a change of state from ON to OFF of any of said plurality of phases of said brushless DC motor.

9. The method in accordance with claim 6, wherein said plurality of pulses of said first false ZCP masking signal is of a second predetermined width.

10. The method in accordance with claim 9, wherein said second predetermined width being wider than said first predetermined width.

11. The method in accordance with claim 6, wherein said state comparator masks away said second plurality of false ZCPs having a plurality of pulses each having a pulse having a same logic value as the preceding pulse of each of said plurality of pulses of said second plurality of false ZCPs.

* * * * *